Jan. 14, 1964  B. N. BRINDLE  3,117,463
TIMING GEAR CHAIN TENSIONING DEVICE
Filed Oct. 26, 1961

BRIAN N. BRINDLE
INVENTOR.

BY

ATTORNEYS

United States Patent Office 3,117,463
Patented Jan. 14, 1964

3,117,463
TIMING GEAR CHAIN TENSIONING DEVICE
Brian N. Brindle, South Benfleet, England, assignor to Ford Motor Company, Dearborn, Mich., a corporation of Delaware
Filed Oct. 26, 1961, Ser. No. 147,784
Claims priority, application Great Britain Feb. 3, 1961
8 Claims. (Cl. 74—242.11)

This invention relates to means for tensioning driving chains or belts and more particularly to an automatic tensioning device for the timing gear chain of an internal combustion engine.

The timing gear chain of an internal combustion engine is susceptible to wear which results in increased slack in the chain. This increased slack has a tendency to make the chain flutter and/or vibrate. In an embodiment of this invention the timing gear chain is correctly tensioned by means of an arm that is biased by a spring urged cam to engage the chain. The cam and arm may be provided with ratchet teeth or serrations. The cam may rotate in response to a spring urging and increase the pressure on the arm which in turn presses upon the timing gear chain. The serrations may be unidirectionally formed to prevent counter-rotation of the cam. Means are also provided to prevent the cam from moving laterally with respect to the arm.

Figure 1:
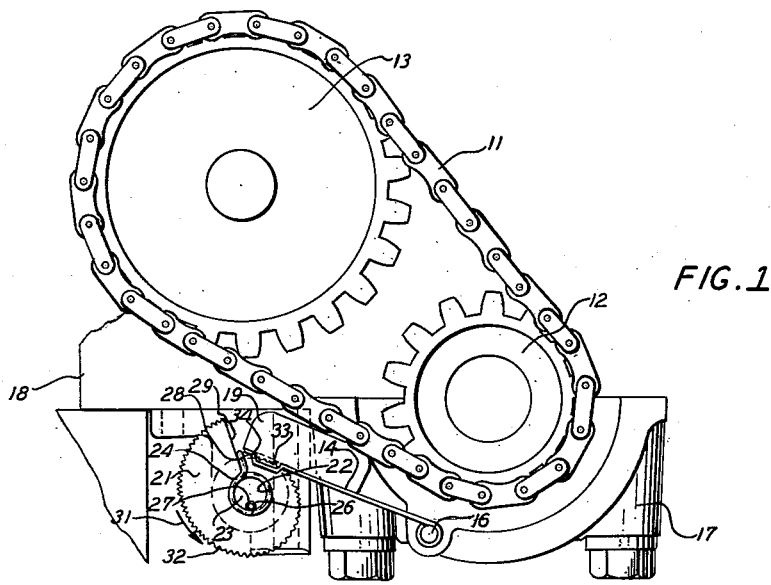
Figure 2:
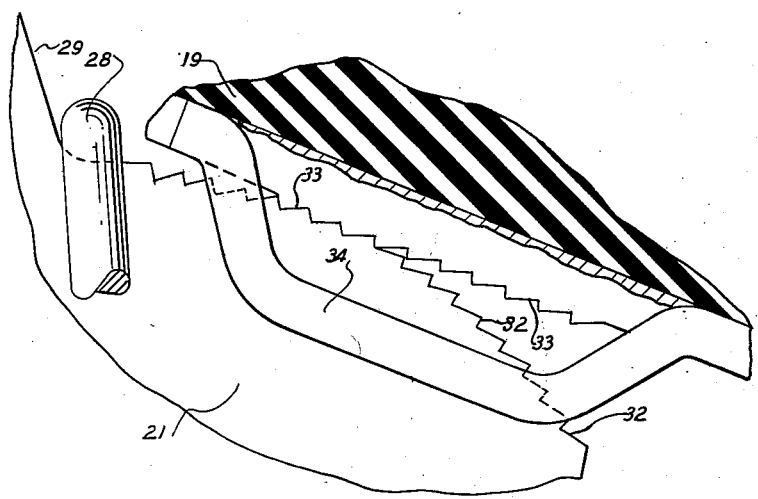

The invention will be more particularly described when considered in connection with the attached drawings, wherein:

FIGURE 1 is a side elevational view of a timing gear chain tensioner embodied in an internal combustion engine, and FIGURE 2 is an enlarged fragmentary view partly in section of the engagement of the arm and the cam.

Referring now to the figures of the drawing and in particular FIGURE 1, the timing gear chain 11 engages the peripheral teeth on the spaced apart crankshaft gear 12 and the timing or camshaft gear 13. A tensioner arm 14 is pivoted at one end upon pivot 16. Pivot 16 may in turn be secured to the bearing cap 17 mounted to the underside of the cylinder block 18 shown in part.

Tensioner arm 14 is provided at its free end with a timing gear chain contacting shoe 19. Shoe 19 may be molded out of a rubber or elastomer and is bonded to the tensioner arm 14.

Cam 21 is the means by which an automatic pressure application is maintained upon the tensioner arm 14 to in turn bear against the timing gear chain 11. Cam 21 is of a snail-type configuration. It is provided with a bore 22 which is located on the axis of rotation of the cam. Cam 21 is mounted upon a pivot 23 in a manner wherein the pivot 23 extends partially into the bore 22. Pivot 23 may be secured to a stationary portion of the internal combustion engine and is in close proximity to the timing gear chain 11.

A coil spring 24 is disposed in part within the bore 22 and may have one end 26 anchored in a groove 27 in the pivot 23. The opposite hooked end 28 of coil spring 24 is anchored on the high back portion 29 of the cam 21. When torsionally stressed prior to assembly, spring 24 will cause the cam to be urged in a counterclockwise direction as indicated by the arrow 31.

Referring now particularly to FIGURE 2, cam 21 is provided on the cam profile or peripheral edge with serrations 32 which may be in the form of ratchet teeth. A central portion of the underside of the arm 14 and opposite to the elastomer shoe 19 is also provided with a plurality of cooperating serrations 33 which engage the serrations 32. Serrations 32 and 33 act as a sear and prevent counterrotation of the cam against the action of the spring 24 and thus serve to maintain the pressure adjustment once made of the shoe 19 against the timing gear chain 11.

The tensioner arm 14 is further provided with a raised portion 34 at each end of the serrations 33 so that part of the cam 21 is contained between raised portions 34. It can be seen therefore that lateral movement of the cam 21 with respect to the tensioner arm 14 is prevented.

As cumulative wear takes place in the timing gear chain 11 sufficiently to allow rotation of the cam 21 one serration, the spring 24 rotates the cam 21 that amount about its pivot 23 thereby increasing the pressure of the shoe 19 against the timing gear 11. That setting is maintained until additional wear has taken place in the timing gear chain 11 to permit an additional serration rotation of the cam.

It is to be understood that the invention is not to be limited to the exact construction shown and described but that various changes and modifications may be made without departing from the spirit and scope of the invention as defined in the appended claims.

What I claim is:

1. A tensioning device for a mechanism having a rotating member driven by an endless flexible member comprising preload means engaging said endless flexible member for exerting a tensioning force thereon, a pivotally supported cam member of progressively increasing radius cooperating with said preload means for increasing the tension on said endless flexible member, and biasing means exerting a rotational force upon said cam means for maintaining a uniform tensioning force upon said endless flexible member, said tensioning device including locking means for permitting pivotal movement of said cam member in a first direction and for precluding pivotal movement of said cam member in a second direction.

2. A chain tensioning device for a mechanism having at least a pair of spaced apart rotating members having parallel axes and a chain connecting said members for simultaneous rotation, said device comprising a pivoted arm, a cam mounted upon an axis adjacent to said pivoted arm, means urging said cam to rotate about its axis, said pivoted arm having a first portion engaging the chain at all times, and a second portion engaging said cam, and ratchet locking means on one of said cam and said second portion permitting rotation of the cam in a direction to increase pressure of the first portion on said chain upon the accumulation of an increment of slack in the chain.

3. A chain tensioning device for a mechanism having at least a pair of spaced apart rotating gears having parallel axes and a chain connecting said gears for simultaneous rotation, said device comprising an arm, a cam mounted upon an axis adjacent to said arm, means urging said cam to rotate about its axis, said arm having a first portion engaging the chain at all times, and a second portion engaging said cam, ratchet locking means on said cam and said second portion permitting rotation of the cam in a direction to increase pressure of the first portion on said chain upon the accumulation of an increment of slack in the chain, and means on one of said cam and said arm preventing lateral movement of the other of said arm and said cam.

4. A chain tensioning device for a mechanism having at least a pair of spaced apart rotating members having parallel axes and a chain connecting said members for simultaneous rotation, said device comprising a pivoted arm, a cam mounted upon an axis adjacent to said arm and provided with ratchet teeth about its periphery, spring means urging said cam to rotate about its axis, said pivoted arm having an elastomer portion engaging the chain at all times, and a ratchet toothed portion engaging said cam ratchet teeth, said ratchet teeth being unidirectionally directed to permit rotation of the cam in a direction to increase pressure of the elastomer portion on said chain upon the accumulation of a ratchet tooth increment of slack in the chain.

5. A chain tensioning device for a mechanism having at least a pair of spaced apart rotating members having parallel axes and a chain connecting said members for simultaneous rotation, said device comprising a pivoted arm, a cam mounted upon an axis adjacent to said arm and provided with ratchet teeth about its periphery, spring means urging said cam to rotate about its axis, said pivoted arm having an elastomer portion engaging the chain at all times, and at least one ratchet tooth engaging said cam ratchet teeth, said ratchet teeth on said cam and said ratchet tooth on said pivoted arm being unidirectionally directed to permit rotation of the cam in a direction to increase pressure of the elastomer portion on said chain upon the accumulation of a ratchet tooth increment of slack in the chain.

6. A timing gear chain tensioning device for an internal combustion engine having a crankshaft gear and a camshaft gear, said crankshaft gear and said camshaft gear being spaced apart and having parallel axes, a timing gear chain connecting said gears for simultaneous rotation, said timing gear chain tensioning device comprising an arm pivoted at one end, a cam having peripheral serrations mounted upon an axis adjacent to the free end of the arm, spring means urging said cam to rotate about its axis, said arm having an elastomer portion at the free end of the arm engaging the timing gear chain at all times, and serrations on the opposite side of the arm to said elastomer portion engaging the peripheral serrations on said cam, said serrations on both said cam and said arm permitting rotation of the cam in a direction to increase pressure of the elastomer portion on said timing gear upon the accumulation of a serration increment of slack in the chain, and limit means on said arm to prevent the lateral movement of said cam relative to said arm.

7. In an internal combustion engine a crankshaft gear, a timing gear, said crankshaft gear and said timing gear being rotatably mounted on separate but parallel axes, a timing gear chain connecting said crankshaft gear and said timing chain gear for simultaneous rotation, a timing gear chain tensioning device comprising an arm pivoted at one end and including an elastomer shoe at the free end and on one side of said arm, and a plurality of serrations on the side of the arm opposite to the elastomer shoe, a cam having a plurality of serrations about its peripheral edge mounted upon a fixed axis and spring urged to rotate about its axis in one direction, said serrations on said cam peripheral edge engaging said serrations on said pivoted arm and urging said elastomer shoe to engage the chain at all times, said spring urged cam rotating about its axis upon the accumulation of a serration increment of slack in the chain, and means on said arm for preventing lateral movement of said cam relative to said arm.

8. A tensioning device for a mechanism having at least a pair of spaced apart rotating members, an endless flexible member connecting said rotating members for simultaneous rotation, said tensioning device comprising a pivoted arm, a cam mounted upon an axis adjacent said pivoted arm, said cam having a progressively increasing radius, biasing means exerting a rotational force upon said cam, said pivoted arm having a first portion engaging said endless flexible member and a second portion engaging said cam, and ratchet locking means on one of said cam and said second portion permitting rotation of said cam in a direction to increase the pressure of said first portion on said endless flexible member upon the accumulation of an increment of slack in said endless flexible member.

References Cited in the file of this patent

UNITED STATES PATENTS

| 1,605,962 | Lovejoy | Nov. 9, 1926 |
| 2,123,978 | Wagner | July 19, 1938 |
| 2,963,918 | Blakstad | Dec. 13, 1960 |
| 2,973,652 | Kelch | Mar. 7, 1961 |

FOREIGN PATENTS

| 1,035,900 | France | Apr. 22, 1953 |